Figure 1:
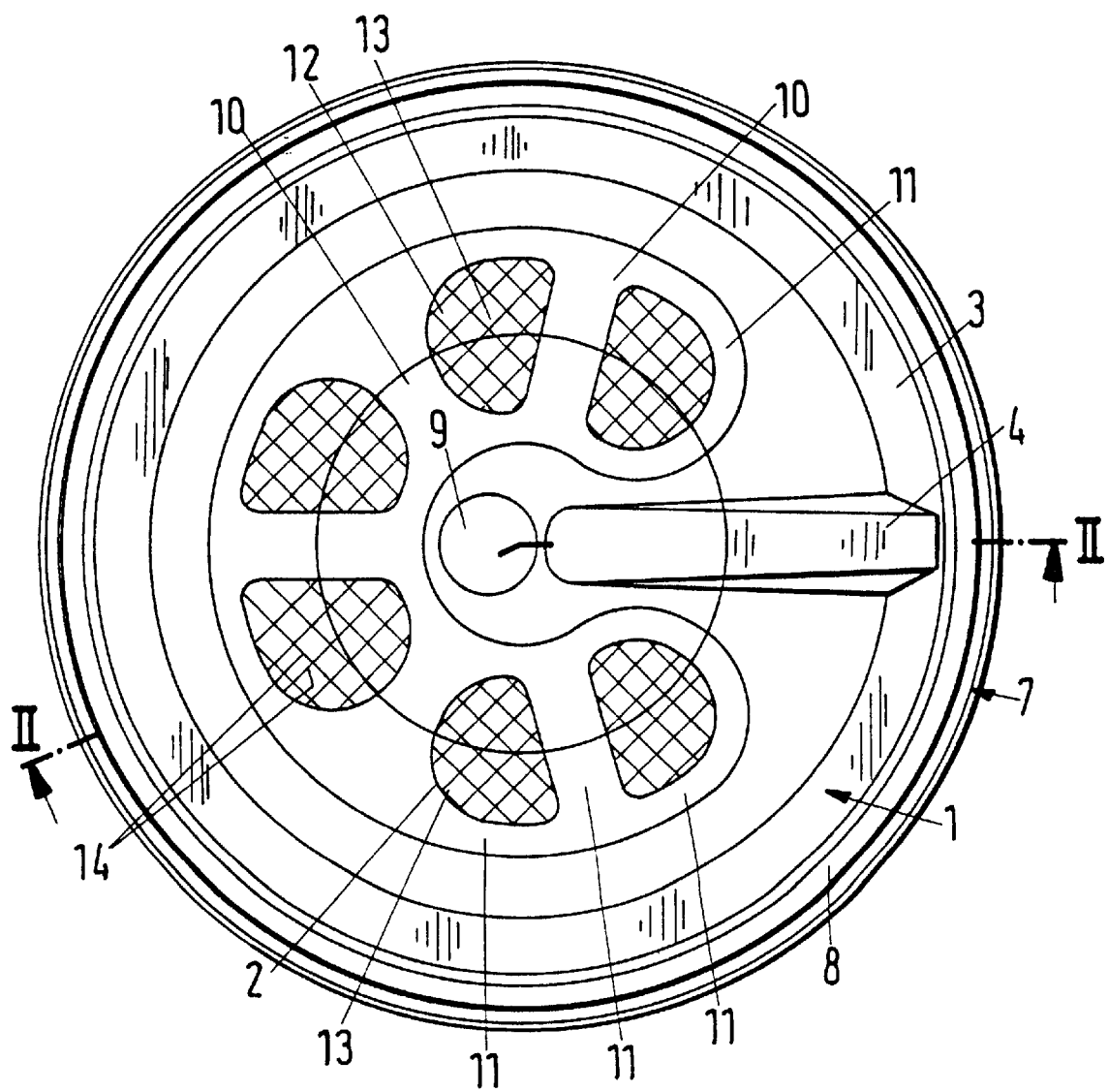

United States Patent [19]
Bairischer

[11] Patent Number: 6,099,728
[45] Date of Patent: *Aug. 8, 2000

[54] FILTER CARTRIDGE WITH A SIEVE IN AN OUTLET APERTURE

[75] Inventor: Uwe Bairischer, Londonderry, N.H.

[73] Assignee: BRITA Wasser-Filter-Systeme GmbH, Taunusstein, Germany

[*] Notice: This patent is subject to a terminal disclaimer.

[21] Appl. No.: 08/910,964

[22] Filed: Aug. 7, 1997

[30] Foreign Application Priority Data

Aug. 13, 1996 [DE] Germany .......................... 196 32 538

[51] Int. Cl.[7] .................................................. B01D 27/08
[52] U.S. Cl. .......................... 210/266; 210/282; 210/291
[58] Field of Search .................................... 210/266, 282, 210/289, 291, 470

[56] References Cited

U.S. PATENT DOCUMENTS

| | | | |
|---|---|---|---|
| 2,630,227 | 3/1953 | Rodwell | 210/131 |
| 4,969,996 | 11/1990 | Hankammer | 210/282 |
| 5,002,665 | 3/1991 | Brueggemann | 210/266 |
| 5,049,272 | 9/1991 | Nieweg | 210/282 |
| 5,071,551 | 12/1991 | Muramatsu et al. | 210/266 |

FOREIGN PATENT DOCUMENTS

WO 92/19552  11/1992  WIPO .
WO 96/21621  7/1996  WIPO .

*Primary Examiner*—Ivars Cintins
*Attorney, Agent, or Firm*—Michael L. Dunn

[57] ABSTRACT

A filter cartridge which can be filled with granular filter material, approximately in the shape of a cup open at the top which can be closed with a lid. This filter cartridge has a base (1) with at least one outlet aperture (2), has a sieve means (12) and side walls (3) and is for filtering liquids, in particular water. In order that even small granulate particles of, for example, $\leq 200$ $\mu$m wide cannot pass through the outlet apertures (2) in the base (1), and nevertheless good through flow of the liquid to be purified is ensured, it is provided according to the invention that 1–64 outlet apertures (2) are provided, each with a fabric insert (12) with plastics frames (11), with a pore size in the fabric of 50 $\mu$m to 300 $\mu$m, preferably 80 to 200 $\mu$m.

9 Claims, 2 Drawing Sheets

FILTER CARTRIDGE WITH A SIEVE IN AN OUTLET APERTURE

The invention relates to a filter cartridge, which can be filled with granular filter material, approximately in the shape of a cup which is open at the top and can be closed with a lid, with a base with at least one outlet aperture, with sieve means and with side walls, for filtering liquids, in particular water.

For filtering water, it is known to use ion exchangers and/or activated charcoal as filter material. In operation, the filter cartridge of known filter means has its central longitudinal axis preferably vertically arranged such that the lid is at the top and the base of the filter cartridge is at the bottom. The water to be filtered flows into the lid at the top (through inlet apertures) and leaves the filter cartridge below at the base. Such filter cartridges are inserted in a funnel provided for them in a water purification device. The funnel is placed on a receiving or collecting container for filtered liquid, and preferably is closed at the top with a removable lid. Into the funnel at the top, the user places, for example, tap water, which can be used for preparing tea or the like after passing through the filter means into the collecting container.

Filter cartridges are known which have narrow slits forming the inlet and outlet apertures, as these are easy to manufacture using injection moulding techniques. Injection mouldable plastics is preferably used for such filter means.

It is desirable for as effective filtering as possible to provide the liquid entering the filter means, the water, with as large a surface of filter material as possible, and to force the liquid to undergo as intensive and comprehensive an adsorption procedure as possible. It is known that when granulates are used as filter material, the smaller the size of the individual filter particles, the greater the active surface. It may happen that particles of approximately 200 µm and smaller are present in the filter material. The active surface available to the liquid to be filtered passing through is thus satisfactorily large. With this advantage also comes the disadvantage, however, that some of these smallest granulate particles pass through the inlet aperture in the lid and the outlet apertures in the base. The particles, for example black activated charcoal particles, some floating on the surface of the liquid, bother the user and are undesirable.

The manufacturer of such filter means has naturally attempted to reduce the size of the outlet apertures in the filter cartridge. With the slit shape for these apertures which is easily achievable by injection moulding, there has been no success, in a reproducible and controlled manner, in making the width of the slits less than 200 µm with precision. In particular, activated charcoal particles can be plate-shaped, their minimum dimension reaching 250 µm or less, so it is precisely these particles, which are easily optically visible to the end-user, which can pass through the inlet and outlet slits already representing the lower limit for injection moulding technology.

Planar sieve fabrics in the form of fibrous webs are already being placed on the inner surface of the base of a filter cartridge and in this way prevent the passing out of smaller particles. Disadvantageously, however, germs collect on such fibrous webs and sieve fabrics made, for example, from paper pulp.

The object of the invention is to improve the known filter cartridge such that on the one hand even small particles of granulate of, for example, ≦200 µm wide cannot pass through the outlet apertures in the base, and nevertheless ensuring good through flow of the liquid to be purified is ensured.

In accordance with the invention, this object is solved in that 1–64 outlet apertures are provided, each with a fabric insert with plastics frames, with a pore size in the fabric of 50 µm to 300 µm, preferably of 80 µm to 200 µm. When using sieve fabrics made from plastics with the pore size described, the provision of all shapes and sizes of outlet apertures in the base of the filter cartridge is not possible without problems relating to the through flow. On the other hand, the use of very fine sieves with pores of the order of size described is necessary in order to successfully hold back these small granulate particles. When the number of outlet apertures in the base is selected in the range of between 1 and 64, it has been unexpectedly established that the through flow problems feared are minimised. The through flow blockage feared and the blockage of the liquid through flow determined in many examples can be prevented by the use of a particular, selected fabric as an insert with a frame, where there are 1 to 64 outlet apertures in the base. With this, a solution has been found for both keeping back the small granulate particles and for maintaining the through flow of the liquid to be filtered through the filter cartridge.

It has further been shown that with 1–64 outlet apertures in the base, the proportion of outlet surface to the whole base surface is in the range of 0.43(=1/2.3) to 0.13(=1/7.7). The frames of the fabric insert can be approximately the same thickness as the base of the filter cartridge, so the fabric insert configured in this way can be flush with the base surface. The through flow conditions for the liquid to be filtered are in this way improved further. If with this number of outlet apertures in the base, the proportion of the outlet surface to the whole base surface is kept within the range described, the smallest of the throttle effects previously found is ascertained. The skilled person would therefore have the teaching to hand, to provide a specific size and number of outlet apertures such that only a specific outlet surface is produced in relation to the total base surface available.

The effects sought by means of the invention are particularly advantageous when 3–16 outlet apertures are provided in the base and the proportion of the outlet surface to the whole base surface in the range of 0.38(=1/2.6) to 0.16(=1/6.25). With many embodiments according to the invention, it has been shown that by this selection of the number of outlet apertures in the base on the one hand, and of the relationship described of the surfaces to one another on the other hand, the smallest possible blockage effect, if at all, for the liquid flowing through can be produced.

The numerous tests and experiments by the applicant have lead to the particularly preferred solution whereby six outlet apertures are provided in the base of the respective cartridge, and the proportion of the outlet surface to the whole base surface is approximately 0.303 (=1/3.3). The through flow of the liquid takes place without interference, without blockage or throttle effect which could possibly be produced by the surface tension of the liquid to be filtered or by the pressure ratios.

The ability of the filter cartridge to retain the small granulate particles is also improved in the upper area according to the invention in that between the filter cartridge and the lid, a sieve fabric is arranged, which is preferably joined integrally to the lid. With this, it is particularly preferred when the fabric insert is configured with a part projecting into the inside of the filter cartridge, for example a dome-shape, such that a contact is produced between the fabric insert and the filter material. In this way, one has on the one hand the good capacity for retention by means of the sieve means with the small pore size, and on the other hand the surface tension of a liquid with the property of water is interrupted, resulting in a good capacity for through flow.

In both the lid area and the base area of the filter cartridge according to the invention, advantageous flow problems of the liquid to be filtered are produced, although with conventional filter cartridges the pressure ratios sometimes cannot overcome the blocking effects. The observation of the teaching according to the invention alleviates the defects of the known filter cartridges. Any air cushions are pushed away so that the pressure of the column of liquid, even when small, encounters no significant counter pressures. The liquid to be filtered can flow without any problem through the filter material and the small particles of the filter material are at the same time held back extremely well.

Even when the plastics threads are non-woven, the words "fabric insert" or "sieve fabric" can be used for a net-like sieve construction. Thin plastics threads cross at right angles or at an angle and in this way make pores of a size which could not be made this small in the case of the slits using injection moulding techniques. As with a gauze, the fabric insert made from plastics can also be shaped and cut.

It can be advantageous from a manufacturing point of view to join the base of the filter cartridge or to the lid to the fabric insert in a non-removable manner. The injection moulding manufacturer can, for example, mould the base of the filter cartridge or the whole cartridge such that the fabric insert is injection moulded into it and, for example, also welded. The frame surrounding and supporting the actual plastics fabric can be arranged flush with the base. Such an intermediate product can then be delivered to the filling plant where is available in magazines and is taken hold of by an automatic filling and closing machine. Neither a machine, nor the manufacturer's staff have then to bother with individual fabric inserts or transport and arrange them with particular care. The filter cartridge must nevertheless be correctly positioned for filling and closing, and when the base is joined in a non-removable manner to the fabric insert, no special assembly step is additionally necessary.

The use of a hydrophilised plastics fabric in the base of a filter cartridge of the type described hereinabove is also advantageous. In order to improve, that is to say to shorten, the through flow time of the liquid to be filtered, it is advantageous to treat the sieve fabric made from plastics with substances by means of which the fabric becomes hydrophillic. These substances can be liquids which affect the surface of the plastics.

In a similar manner, in accordance with the invention a bacteriostatically treated plastics fabric can be used in the filter cartridge described hereinabove. There are different methods for this, among which are the effects of steam, irradiation and the like.

Further advantages, features and possibilities for application of the present invention will be evident from the following description of a preferred embodiment with reference to the attached drawings. In these is shown, in FIG. 1 a view of the base of the filter cartridge, when viewed from the outside in the direction of the central longitudinal axis, and FIG. 2 a cross-section view through the filter cartridge according to the invention.

The embodiment of the filter cartridge shown here has the shape of a cup open at the top which can be closed by a lid which is not shown. In the base 1 there are located six outlet apertures 2, and closed side walls 3 extend, slightly widening in a conical manner, from the base 1 upwards. At one point on the periphery the side walls 3 are interrupted by a side notch 4 which can also be used to control the rotary positioning of the filter cartridge when being arranged in the filtering device, by means of a loose tongue and groove engagement. In the cross-section view shown in FIG. 2, this side notch is clearly visible as the section runs according to the angled, dashed line II—II exactly through the centre of this side notch 4. If this dashed line of intersection in FIG. 1 is followed, the bending point is in the centre of the base 1, through which the central longitudinal axis 5 shown vertically and by a dot-and dashed line in FIG. 2 runs. From there, the line of intersection II—II extends to the left so that an outlet aperture 2 in the base 1 is intersected.

Figure 2:
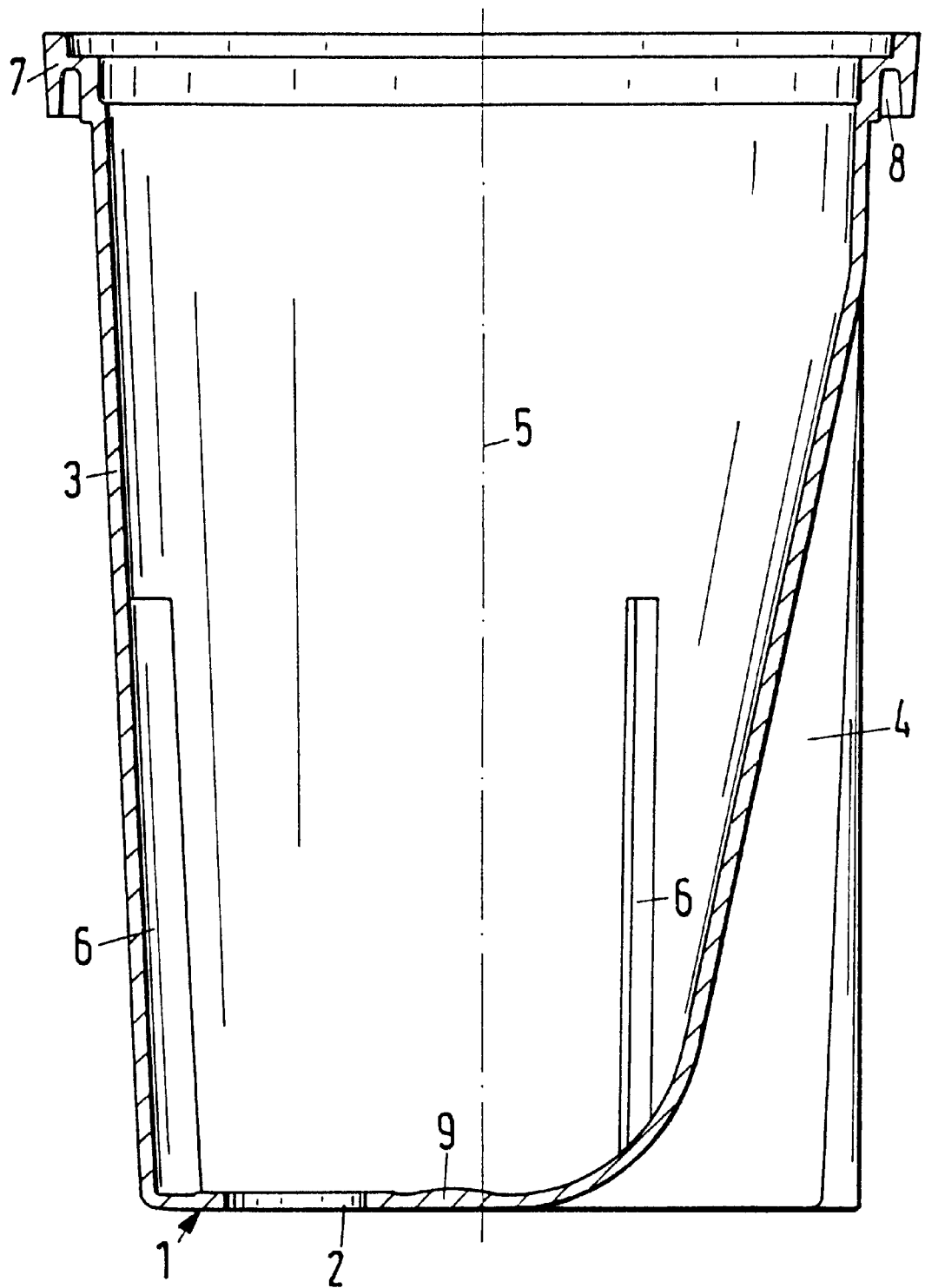

FIG. 2 shows two stacking ribs 6, which are arranged on the inside of the conical side wall 3 and extend from the base 1 upwards over approximately half the height of the side wall 3. They are regularly distributed at an angle such that in this embodiment, for example, three are arranged. After stacking one inside another, the finished filter cartridges are set down on these stacking ribs 6 for storage. Before assembly of the whole filter means, in particular the joining of the filter cartridge to the lid, which is not shown, these empty filter cartridges can be stored in rod-like stacks in a magazine.

At the top wide end of the conical side wall 3, there is located a sealing flange 7 with an annular groove 8.

The side walls 3 are injection moulded in one piece with the base 1, wherein the cross-section view FIG. 2 shows the feeding centre 9 in the base at the bottom in the thickened area. With injection moulding techniques of manufacture, the plastics flows from this feeding centre 9 through the radial channels 10 towards the outside, wherein the outlet apertures 2 in the frame 11 being formed are constructed with the fabric inserts 12. These fabric inserts 12 are injected over the frames 11 in the base 1 and joined integrally to them. The pores 13 between the plastics threads 14 are indicated by cross-hatching in FIG. 1.

With the embodiment selected here, six outlet apertures 2 are provided inside the C-shaped frame 11. This outlet surface AF6 is made in proportion to the whole base surface such that a value of 1/3.3=0.303 . . . has formed.

With another embodiment, which is not shown, with three outlet apertures and a further one with sixteen outlet apertures, with a comparable formation of the proportions, the proportion $VF_{3-6}$ is in a range of between 1/2.6=0.384 on the one hand and 1/6.25=0.16 on the other hand. In other words, $1/2.6 \geq VF_{3-16} \geq 1/6.25$.

Further experiments with embodiments with 1–64 apertures have shown that the corresponding relationship is $1/2.3 \geq VF_{1-64} \geq 1/7.7$.

VF6 is then the proportion of the outlet surface to the whole base surface in the case of six outlet apertures. $VF_{3-16}$ is the proportion of the outlet surface to the whole base surface when the number of outlet apertures was in the range between three and sixteen. Accordingly, when the number of outlet apertures was in the range of between 1 and 64, $VF_1=1/2.3$ and $VF_{64}=1/7.7$.

What is claimed is:

1. A filter cartridge, filled with granular filter material said cartridge being open at a top and which can be closed with a lid, said cartridge further having a base (1) having a whole base surface with at least one outlet aperture (2), with a sieve means (12) and with side walls (3) for filtering water, wherein 1–64 outlet apertures (2) are provided in the base, each with a woven fabric insert (12), a plastic frame (11), and a pore size in the fabric of 50 $\mu$m to 300 $\mu$m, wherein the fabric is a plastic fabric having a hydrophilic surface, the proportion $VF_{1-64}$ of the outlet surface (A) to the whole base surface (B) is in the range of 0.43 (=1/2.3) and 0.13 (1/7.7).

2. The cartridge of claim 1, wherein the pore size is from 80 $\mu$m to 200 $\mu$m.

3. A filter cartridge according to claim 1, wherein 3–16 outlet apertures (2) are provided in the base (1) and the proportion $VF_{1-64}$ of the outlet surface (A) to the whole base surface (B) is in the range of 0.38 to 0.16.

4. A filter cartridge according to claim 3, wherein a bacteriostatically treated plastics fabric is used in said insert.

5. A filter cartridge according to claim 1, wherein six outlet apertures (2) are provided in the base (1) and the proportion $VF_{1-64}$ of the outlet surface (A) to the whole base surface (B) is approximately 0.303.

6. A filter cartridge according to claim 5, wherein a bacteriostatically treated plastics fabric is used in said insert.

7. A filter cartridge according to claim 1, wherein a sieve fabric is arranged between the filter cartridge and the lid.

8. A filter cartridge according to claim 7, wherein a bacteriostatically treated plastics fabric is used in said insert.

9. A filter cartridge according to claim 1, wherein a bacteriostatically treated plastics fabric is used in said insert.

* * * * *